(12) United States Patent
Feher

(10) Patent No.: US 8,201,411 B2
(45) Date of Patent: Jun. 19, 2012

(54) DEEP CHILLED AIR WASHER

(75) Inventor: Peter Feher, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 771 days.

(21) Appl. No.: 12/332,388

(22) Filed: Dec. 11, 2008

(65) Prior Publication Data
US 2010/0146977 A1 Jun. 17, 2010

(51) Int. Cl.
F02C 1/00 (2006.01)
F02G 3/00 (2006.01)

(52) U.S. Cl. .......................... 60/728; 60/39.53; 60/772

(58) Field of Classification Search .................... 60/728, 60/39.511, 39.53, 765, 39.3, 772
See application file for complete search history.

(56) References Cited

U.S. PATENT DOCUMENTS

| 3,788,066 | A |   | 1/1974 | Nebgen |        |
|-----------|---|---|--------|--------|--------|
| 4,519,207 | A |   | 5/1985 | Okabe et al. | |
| 4,951,460 | A | * | 8/1990 | Prochaska et al. | 60/791 |
| 5,010,726 | A | * | 4/1991 | Garland | 60/775 |
| 5,203,161 | A |   | 4/1993 | Lehto  |        |
| 6,318,065 | B1 |  | 11/2001 | Pierson |       |
| 6,470,686 | B2 |  | 10/2002 | Pierson |       |
| 6,532,754 | B2 |  | 3/2003 | Haley et al. |   |
| 6,615,585 | B2 | * | 9/2003 | Tsuji | 60/728 |
| 6,769,258 | B2 |  | 8/2004 | Pierson |       |
| 6,848,267 | B2 |  | 2/2005 | Pierson |       |
| 6,946,021 | B2 | * | 9/2005 | Aoyagi | 96/226 |
| 6,964,168 | B1 |  | 11/2005 | Person et al. | |
| 7,343,746 | B2 |  | 3/2008 | Pierson |       |
| 7,980,081 | B2 | * | 7/2011 | Mak | 60/779 |
| 7,998,249 | B2 | * | 8/2011 | Feher | 95/187 |
| 2001/0054354 | A1 | * | 12/2001 | Baudat et al. | 95/214 |
| 2005/0056023 | A1 |  | 3/2005 | Pierson |      |
| 2005/0103032 | A1 |  | 5/2005 | Pierson |      |
| 2007/0044485 | A1 | * | 3/2007 | Mahl | 62/50.2 |
| 2007/0240400 | A1 |  | 10/2007 | Smith et al. | |
| 2007/0248453 | A1 |  | 10/2007 | Tetu et al. |  |
| 2007/0294984 | A1 |  | 12/2007 | Chillar et al. | |
| 2008/0098890 | A1 |  | 5/2008 | Feher |        |
| 2008/0098891 | A1 |  | 5/2008 | Feher et al. | |

FOREIGN PATENT DOCUMENTS
WO 2005/119029 A1 12/2005
WO WO 2006/068832 A1 * 6/2006
* cited by examiner Primary Examiner — Ehud Gartenberg
Assistant Examiner — Carlos A Rivera
(74) Attorney, Agent, or Firm — Sutherland Asbill & Brennan LLP

(57) ABSTRACT

A deep chilled air washer for a gas turbine compressor. The deep chilled air washer may include one or more spray arrays for chilling an inlet air stream and one or more drift eliminators positioned downstream of the spray arrays. The drift eliminators may include a heating element therein so as to reheat the inlet air stream.

17 Claims, 2 Drawing Sheets

DEEP CHILLED AIR WASHER

TECHNICAL FIELD

The present application relates generally to gas turbine engines and more particularly relates to inlet air deep chilling and filtration systems for use with a gas turbine.

BACKGROUND OF THE INVENTION

Air chilling systems are often used with gas turbines to condition the inlet air temperature. Depending upon the ambient temperature, the use of the chilling systems with gas turbine engines may increase overall power output by a significant percentage. Specifically, the power output of the gas turbine is almost in reverse proportion to the inlet air temperature over a wide temperature range. For example, a known gas turbine may produce only about 154 megawatts of power at an ambient temperature of about 83 degrees Fahrenheit (about 28.3 degrees Celsius) but may produce about 171.2 megawatts of power at about 50 degrees Fahrenheit (about 10 degrees Celsius), an increase of more than about eleven percent. Likewise, the chilling systems may be run to temper the cold inlet air with waste heat in cooler ambient temperatures so as to provide efficient part load operation for the gas turbine.

One method of chilling the inlet air, as well as removing contaminants within the air stream, is through the use of a chilled water air washer system. Cooling the inlet air below about 40 degrees Fahrenheit (about 4.4 degrees Celsius) with a chilled water air washer system may be difficult in that it requires a reduction in the relative humidity and the dew point of the air stream. The temperature of the inlet air must be kept above the dew point so as to avoid condensation or freezing of the water contained in the air. Conventional chilling methods, however, may result in the air being very close to saturation, i.e., the relative humidity may be close to 100%. At this condition, the dew point is very close to the air temperature. As such, any further temperature loss may cause icing of components within or about the compressor inlet. These factors generally thus limit conventional inlet air cooling to about 38 to about 44 degrees Fahrenheit (about 3.3 to about 6.6 degrees Celsius).

There is thus a desire for improved gas turbine inlet air chilling systems. Such an inlet air chilling system should provide improved chilling of gas turbine inlet air while increasing overall system output and efficiency without the concern of freezing condensate.

SUMMARY OF THE INVENTION

The present application thus provides a deep chilled air washer for a gas turbine compressor. The deep chilled air washer may include one or more spray arrays for chilling an inlet air stream and one or more drift eliminators positioned downstream of the spray arrays. The drift eliminators may include a heating element therein so as to reheat the inlet air stream.

The present application further provides a method of chilling inlet air of a gas turbine. The method may include the steps of flowing the inlet air though through a spray of a fluid, lowering the temperature of the flow of the inlet air, capturing an amount of a condensate in the flow of the inlet air by the fluid, and heating the inlet air before entering the gas turbine.

The present application further provides for a deep chilled air washer for a gas turbine compressor. The deep chilled air washer may include one or more spray arrays for chilling an inlet air stream, a chiller condenser in communication with the spray arrays to chill the inlet air stream, one or more drift eliminators with a heating element therein so as to reheat the inlet air stream, and a chiller evaporator in communication with the heating element.

These and other features of the present application will become apparent to one of ordinary skill in the art upon review of the following detailed description when taken in conjunction with the several drawings and the appended claims.

DETAILED DESCRIPTION

Figure 1:
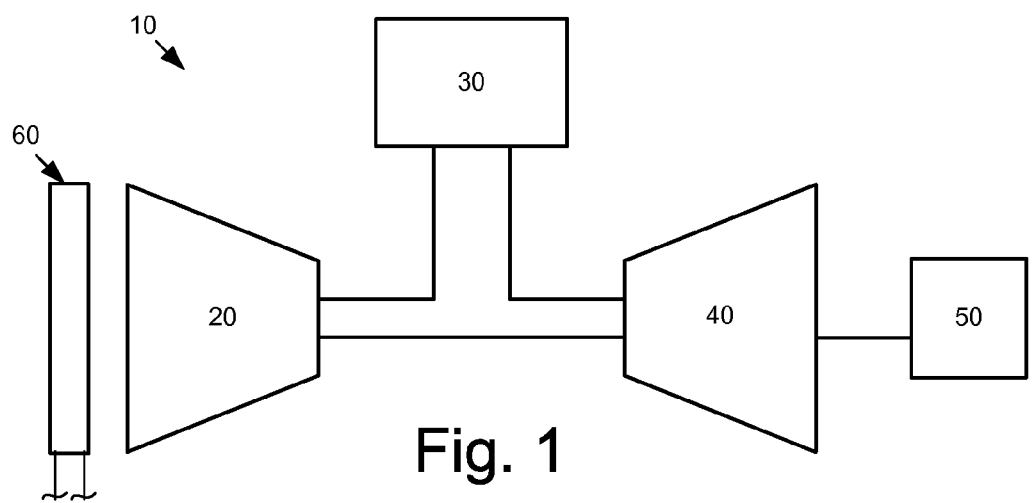
FIG. 1 is a schematic view of a gas turbine engine with an air chilling system.

Referring now to the drawings, in which like numerals refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a flow of fuel and ignites the mixture. (Although only a single combustor 30 is shown, the gas turbine engine 10 may include any number of combustors 30.) The hot combustion gases are delivered in turn to a turbine 40. The turbine 40 drives the compressor 20 and an external load 50 such as an electrical generator and the like. The gas turbine engine 10 may use natural gas, various types of syngas, and other fuels. The gas turbine engine 10 may use other configurations and components herein.

In this example, the gas turbine engine 10 further includes a gas turbine inlet air cooling system 60. The gas turbine inlet air cooling system 60 may be positioned about the compressor 20 and cools the incoming airflow to a desired temperature. The gas turbine inlet air cooling system 60 may use different cooling methods and may take many different configurations.

Figure 2:
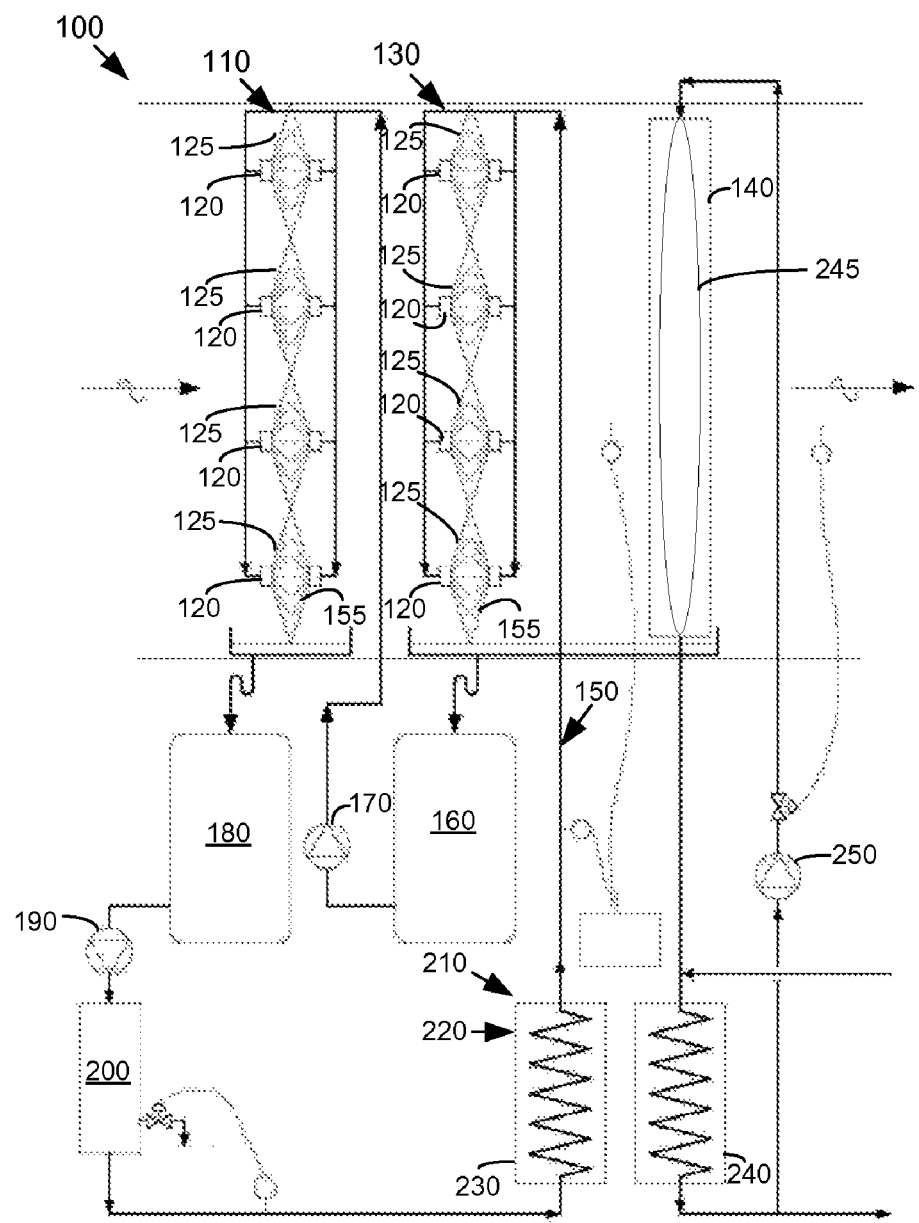
FIG. 2 is a schematic view of a gas turbine inlet air chilling system as is described herein.

FIG. 2 shows a gas turbine inlet air chilling system 60 in the form of a deep chilled air washer 100 as is described herein. As described above, the deep chilled air washer 100 may be positioned about the inlet of the compressor 20 of the gas turbine engine 10. The deep chilled air washer 100 cools the inlet air stream and removes contaminants therein via a water wash.

The deep chilled air washer 100 may include a first stage spray array 110. The first stage spray array 110 may include a number of spray nozzle pairs 120. The spray nozzle pairs 120 may be of conventional design. Any number of spray nozzle pairs 120 may be used herein. As is shown, each spray nozzle pair 120 creates a spray pattern 125 in the form of an inverted double cone. Other types of spray patterns 125 may be used herein. In the aggregate, these spray patterns 125 create a water curtain effect for the inlet air to pass therethrough. Other types of water spray systems also may be used herein.

The deep chilled air washer 100 also may include a second stage spray array 130. The second stage spray array 130 also may include a number of spray nozzle pairs 120 as are described above. Any number of spray nozzle pairs 120 also may be used herein. The spray nozzle pairs 120 may provide the inverted double cone spray pattern 125 or any desired spray pattern. Additional spray arrays 110, 130 also may be used herein. The size, the spacing, and the positioning of the spray arrays 110, 130 may vary.

A number of drift eliminators 140 may be positioned downstream of the spray arrays 110, 130. The drift eliminators 140 generally prevent water carryover into the compressor 20 and/or other types of turbine equipment. Any number of drift eliminators 140 may be used herein. As will be described in more detail below, in this example, the drift eliminator 140 may be in the form or an indirect contact air reheater or other type of heating element or heat exchanger. Other configurations may be used herein.

The deep chilled air washer 100 may include a fluid recirculation system 150 with a fluid 155 therein. In this example, the fluid 155 used herein may be an antifreeze solution of any concentration. Specifically, the solution may be based on propylene glycol or a similar type of fluid. Propylene glycol acts as a freezing point suppressant. Propylene glycol also is non-toxic and environmentally friendly. Other types of freezing point suppressants may be used herein.

The fluid 155 used in the second stage spray array 130 may be collected and stored in an intermediate solution well 160 or other type of container. The fluid 155 then may be pumped via a well pump 170 to the first stage spray array 110. The well pump 170 may be of conventional design. Once used in the first stage spray array 110, the fluid 155 again may be collected in an antifreeze solution well 180 or other type of container. Additional chilling also may be used herein.

The antifreeze solution of the fluid 155 used in the spray arrays 110, 130 may be diluted from the condensate captured from the air. The fluid 155 thus may be pumped from the antifreeze solution well 180 via a concentrator pump 190 to a solution concentrator 200. The solution concentrator 200 may separate the water from the antifreeze solution so as to maintain the fluid 155 at its desired concentrate level. The solution concentrator 200 may separate the water therein via a membrane or via thermal means to evaporate the water. Other types of concentrators may be used herein to maintain the concentration of the fluid 155

The deep chilled air washer 100 also may include a cooling and heating system 210. Inlet air systems typically use a chiller so as to chill the fluid flowing therein. The cooling and heating system 210 thus includes a chiller 220. As is known, the chiller 200 includes a chiller evaporator 230 and a chiller condenser 240. The chiller evaporator 230 chills the fluid 155 therein to the desired temperature before it is sent to the spray arrays 110, 130. Heat in the fluid stream generally is removed via the chiller condenser 240. The chiller condenser 240 generally is in communication with a cooling tower (not shown) or other type of heat sink. In this example, however, the chiller condenser 140 may be in communication with the drift eliminators 140. Specifically, the drift eliminators 140 may include a heated water loop 245 therein so as to provide indirect contact heating with the air stream passing therethrough. The hot water may be pumped via a drift eliminator pump 250. The drift eliminators 140 may use any type of heating element, heat exchanger, or other type of device therein.

In use, inlet air may enter the deep chilled air washer 100 at about 50 degrees Fahrenheit (about 10 degrees Celsius). The air passes through the spray arrays 110, 130 and may be chilled below freezing. For example, the inlet air stream may be chilled to about 18 degrees Fahrenheit (about −7.8 degrees Celsius). As the air passes through the spray arrays 110, 130, condensate in the air may be captured by the fluid 155. As a result, the air may be close to the saturation point. To avoid icing about the compressor 20, the air may be reheated to about 5 to about 8 degrees Fahrenheit (about −15 to about −13.3 degrees Celsius) above the dew point as it passes through the drift eliminator 140 and the heated water loop 245.

The deep chilled air washer 100 thus reduces the water content of the air by condensation below the freezing point and then uses waste heat from the chiller 220 to reheat the air by a few degrees in the drift eliminator 140 to provide an anti-icing margin for the compressor 20. Significantly, the use of the waste heat comes at virtually no cost to overall system efficiency. Condensate is then removed from the fluid 155 via the solution concentrator 200 and the cycle may be repeated.

The deep chilled air washer 100 thus may increase overall system output and efficiency in all weather conditions. Specifically, the inlet pressure drop may be reduced. Moreover, the cleaning of the inlet air should increase equipment lifetime and reliability.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. A deep chilled air washer for a gas turbine compressor comprising:

one or more spray arrays spraying a fluid chilling an inlet air stream;

one or more drift eliminators positioned downstream of the one or more spray arrays and upstream of the gas turbine compressor;

the one or more drift eliminators comprising a heating element therein so as to reheat the inlet air stream; and a heat recovery system in thermal communication with the one or more spray arrays and with the heating element, the heat recovery system comprising a chiller transferring heat absorbed by the fluid from the inlet air stream to the heating element in the one or more drift eliminators.

2. The deep chilled air washer of claim 1, wherein the one or more spray arrays comprise a first stage spray array and a second stage spray array.

3. The deep chilled air washer of claim 1, wherein the one or more spray arrays comprise a plurality of spray nozzle pairs.

4. The deep chilled air washer of claim 1, further comprising a fluid recirculation system.

5. The deep chilled air washer of claim 4, where in the fluid recirculation system comprises the fluid therein.

6. The deep chilled air washer of claim 5, wherein the fluid comprises a propylene glycol fluid.

7. The deep chilled air washer of claim 4, wherein the fluid recirculation system comprises an intermediate solution well in communication with the one or more spray arrays.

8. The deep chilled air washer of claim 4, wherein the fluid recirculation system comprises an antifreeze solution well in communication with the one or more spray arrays.

9. The deep chilled air washer of claim 4, wherein the fluid recirculation system comprises a solution concentrator.

10. The deep chilled air washer of claim 1, wherein the chiller comprises a chiller evaporator in thermal communication with one or more spray arrays.

11. The deep chilled air washer of claim 10, wherein the chiller comprises a chiller evaporator in thermal communication with the heating element.

12. The deep chilled air washer of claim 11, wherein the heating element comprises a heated water loop.

13. A method of chilling inlet air of a gas turbine, comprising:
- flowing a flow of inlet air through one or more spray arrays of a first fluid to chill the flow of inlet air;
- preventing water carryover from the flow of inlet air to a gas turbine compressor, with one or more drift eliminators downstream the one or more spray arrays and upstream the gas turbine compressor;
- transferring heat absorbed by the first fluid to a second fluid that is circulated through a chiller; and
- heating the flow of inlet air by flowing the said second fluid through a heating element comprised in the one or more drift eliminators, before entering the gas turbine compressor.

14. The method of claim 13, wherein the step of chilling the flow of inlet air comprises lowering the temperature of the flow of inlet air below about 32 degrees Fahrenheit (about 0 degrees Celsius).

15. The method of claim 13, wherein the step of flowing the flow of inlet air through one or more spray arrays comprises removing contaminates form the flow of inlet air.

16. The method of claim 13, further comprising separating a condensate form the first fluid.

17. A deep chilled air washer for a gas turbine compressor, comprising:
- one or more spray arrays spraying a fluid chilling an inlet air stream;
- one or more drift eliminators positioned downstream of the one or more spray arrays and upstream of the gas turbine compressor;
- the one or more drift eliminators comprising a heating element therein so as to reheat the inlet air stream;
- a heat recovery system in thermal communication with the one or more spray arrays and with the heating element, the heat recovery system transferring heat absorbed by the fluid from the inlet air stream to the heating element in the one or more drift eliminators, the heat recovery system comprising:
- a chiller condenser in thermal communication with the one or more spray arrays to chill the inlet air stream; and
- a chiller evaporator in thermal communication with the heating element.

* * * * *